H. A. W. WOOD.
COMBINED MOLDING MACHINE AND STEAM TABLE.
APPLICATION FILED APR. 20, 1906.

1,060,875.

Patented May 6, 1913

UNITED STATES PATENT OFFICE.

HENRY A. WISE WOOD, OF NEW YORK, N. Y., ASSIGNOR, BY MESNE ASSIGNMENTS, TO THE AUTOPLATE COMPANY OF AMERICA, OF JERSEY CITY, NEW JERSEY, A CORPORATION OF NEW JERSEY.

COMBINED MOLDING-MACHINE AND STEAM-TABLE.

1,060,875.

Specification of Letters Patent.   Patented May 6, 1913.

Application filed April 20, 1906.   Serial No. 312,887.

*To all whom it may concern:*

Be it known that I, HENRY A. WISE WOOD, a citizen of the United States, residing at New York, in the county of New York and State of New York, have invented a new and useful Combined Molding-Machine and Steam-Table, of which the following is a specification.

My invention relates to a machine for molding and drying stereotype matrices.

The particular objects of the invention are to provide means whereby matrices can be efficiently molded, fed from the molding devices, covered with a dry blanket, inserted into a drying device, and if desired, left there while the molding device performs a plurality of operations, and removed from the drying device onto a table from which the form can be taken in the usual or any desired manner. It will, of course, be understood that the wet blankets are removed from the forms after they are dried and new dry blankets substituted in position to be moved with the freshly molded forms into the drying device or devices.

My invention also contemplates the employment of means whereby the blankets can be taken up automatically by the forms and retained in position thereon from the time they leave the molding device until they are ready to be removed from the drier or steam table; also an improved feeding arrangement and an improved system of molding elements or rollers used in the molding machine proper, whereby the flong can be more efficiently forced onto the type face and the matrix compacted more thoroughly.

Reference is to be had to the accompanying six sheets of drawings which illustrate several ways in which this and other objects of my invention can be accomplished.

In the simpler form in which my invention is illustrated, special reference being had to the first seven figures, a frame A is provided on which is mounted a matrix molding device B and a steam table or matrix drying device C. Extending along the receiving end of the frame is a stationary platform D. This platform has an extension D' located near the molding device. Located at a point preferably under the extension D' of the stationary table, is a train of gearing 10. This gearing meshes with a rack on a bar 11 for the purpose of reciprocating the latter. I have shown the device as provided with a pair of these bars, one located on each side of the table. For the purpose of feeding forms into the molding machine, I have provided each of these rack bars with a pivoted arm 12, each arm being provided with an inwardly projecting pin or projection 13 adapted to ride along the flat edge surface of the table and engage the rear end of a form as is indicated more clearly in Fig. 11, to slide the form along the table. In order to permit the projection 13 to descend below the level surface of the table at the rear end of the stroke of the rack bars. I have provided the table with a depression 14 having a slanting surface 15. As the rack bars reach the end of the reverse stroke, the projections 13 ride down into these depressions and rest below the surface of the table so that forms may be supplied to the table in the ordinary way without encountering any obstruction. The forms are deposited in front of the depression and when the rack bars move forwardly, the projections 13 are gradually forced up onto the surface of the table and they then pick up the form and carry it forward. For the purpose of guiding the forward end of the form and holding the latter in proper position, the form is provided with a cross-bar 16. This cross-bar may be fixed to the rack bars and under certain conditions, which will be described below, I prefer to make it movable and have shown it as mounted between brackets 17 on the rack bars from which it can be readily removed. This cross-bar is provided with forwardly projecting pins 18. It will be seen that the operation of the gearing will be such as to feed a form into the molding machine where it can be operated upon by the molding rollers 19 and 20. In the form shown in the first seven figures, I have illustrated a third roller 21 and an endless felt blanket 22 passing over these three rollers. I have also shown a pair of rollers 23 mounted below the table and coöperating with the rollers 19 and 20, the latter being held up by springs 24 and adjusted by screws 240. The manner of driving this mechanism is not important. I have shown sets of gears connected with the molding means, and in the form which I am now describing, associated with tight and loose pulleys to drive the rollers 19, 20 and 23 positively in a direction to feed the forms into the molding device and through the same into the steam table. In order to properly provide for carrying on the molding and drying operation in one machine, I have provided means for introducing a dry blanket onto the top of the molded form as it comes from the molding device and for carrying the blanket with the form into the steam table. For this purpose I have shown a frame consisting of a pair of arms 25, which in this case support the bearings of the roller 21, extending from the molding device in a general upward direction. On the upper end of this frame are bearings for a roller 26. This roller is provided with a spring 27 for normally holding it in a certain position and allowing it to unroll a flexible connection 28 and to automatically roll up the flexible connection when allowed to operate in an unrestricted manner. This flexible connection may be in one or several pieces, but I have shown it in the form of a curtain. At its outer end it has wire loops into which hooks 29 are adapted to be placed. These hooks are mounted on an exchangeable blanket 30 which at the bottom carries eyes 31. Under ordinary circumstances, the spring 27 is so proportioned and adjusted that when a dry wool blanket, such as is suitable for application to a molded matrix is hung on the wire loops, the eyes 31 of the blanket will be in such position that the pins 18 above mentioned will engage them and the motion of the form from the molding machine will cause the curtain to be unwound and the blanket to be deposited on the form as the latter advances. In order to force the blanket onto the form as the latter progresses, a roller 32 is mounted at the discharge side of the molding device, and in such position that the blanket normally hangs between it and the molding device. The lower surface of the roller is just high enough above the table to permit the form and blanket to pass under it. From this point the form advances into the steam table where the steam is always on, and the pressure of the platen is then applied. When the matrix is sufficiently dried and it is desired to remove it from the press, the wool blanket is first unhooked from the spring roller and the curtain allowed to ascend. A dry wool blanket is then hooked onto the wound-up curtain from which it hangs down between the molding device and the roller 32. The mat now being dry, the platen of the press is moved away from the table thereof. The molding machine is now started, feeding the next form, which was previously applied to the table, into the rolls and through them. The pins will take up the next dry blanket and the bar pushes the dry mat and form, together with its wet blanket, out of the steam table onto a table 33, a new form taking its place with its dry blanket onto the platen of the press. The operator now puts pressure on the wet mat, then takes off and hangs up the wet blanket from the dry mat, then peels the dry mat and hands it to another operator to be trimmed, backed and roasted. He then slides the form off the table 33 onto the usual movable form table and has it sent back to the composing room. The last blanket is now unhooked from the curtain and the spring roller operates to wind up the latter. This is substantially the operation which takes place in all the forms illustrated.

Figure 1:
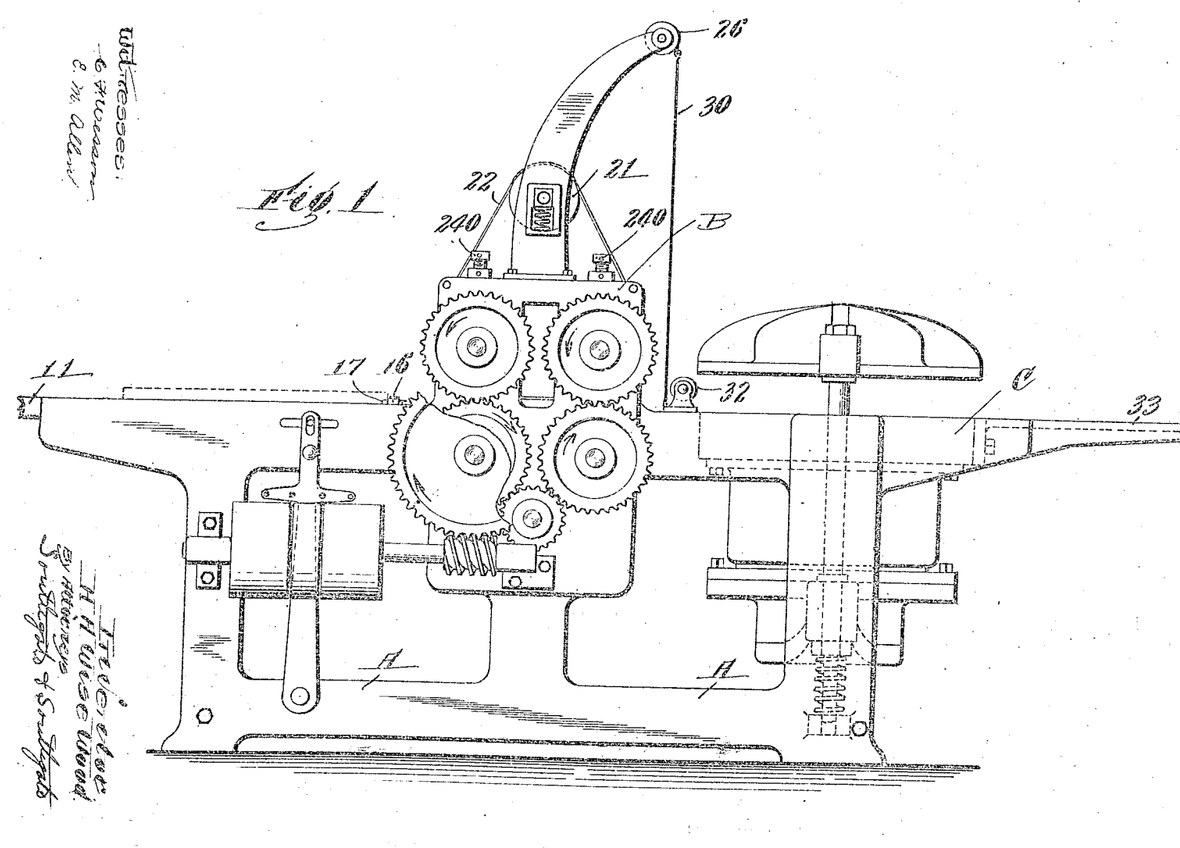
Figure 1 is a side elevation of a machine constructed in accordance with the principles of my invention.
Figures 2, 3:
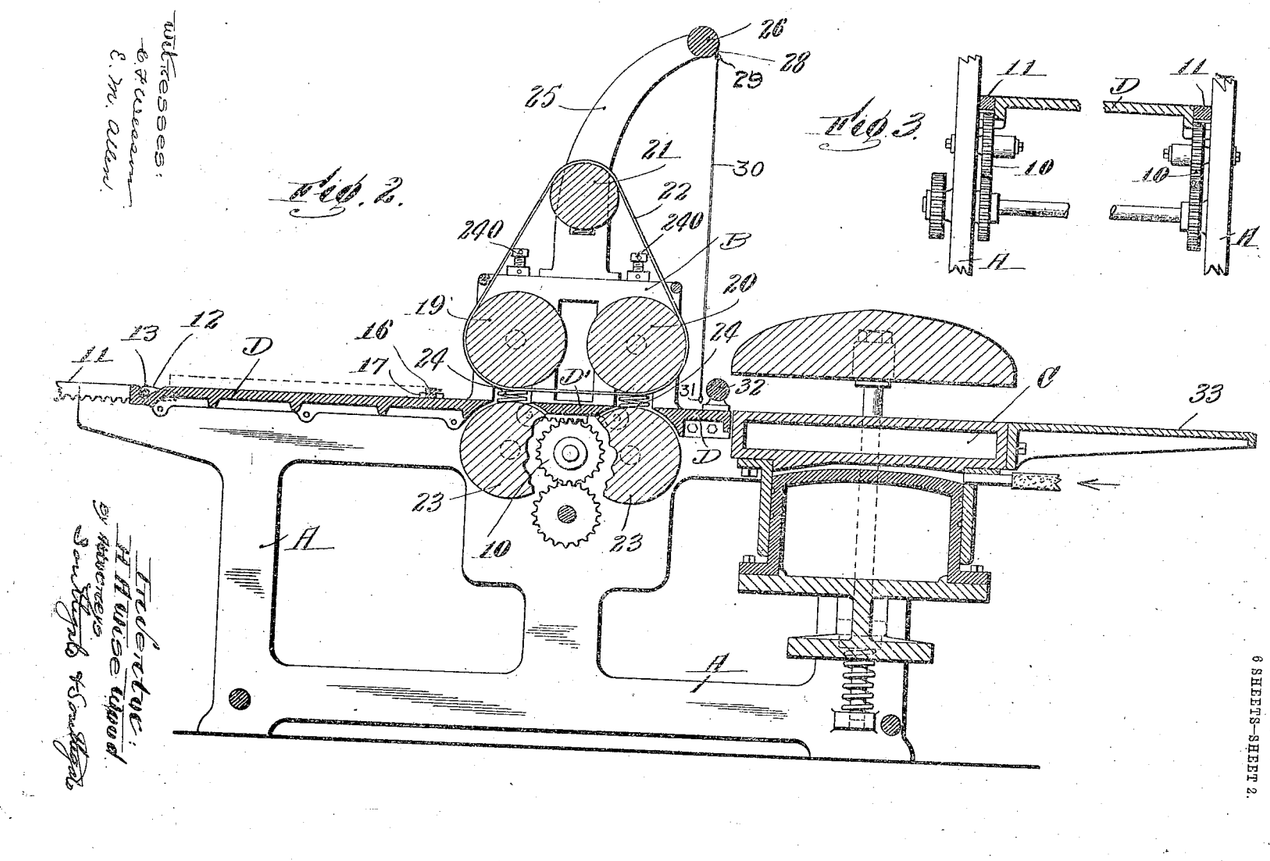
Fig. 2 is a central, longitudinal sectional view of the same.
Fig. 3 is a transverse sectional view.
Figures 4, 5, 6, 7:
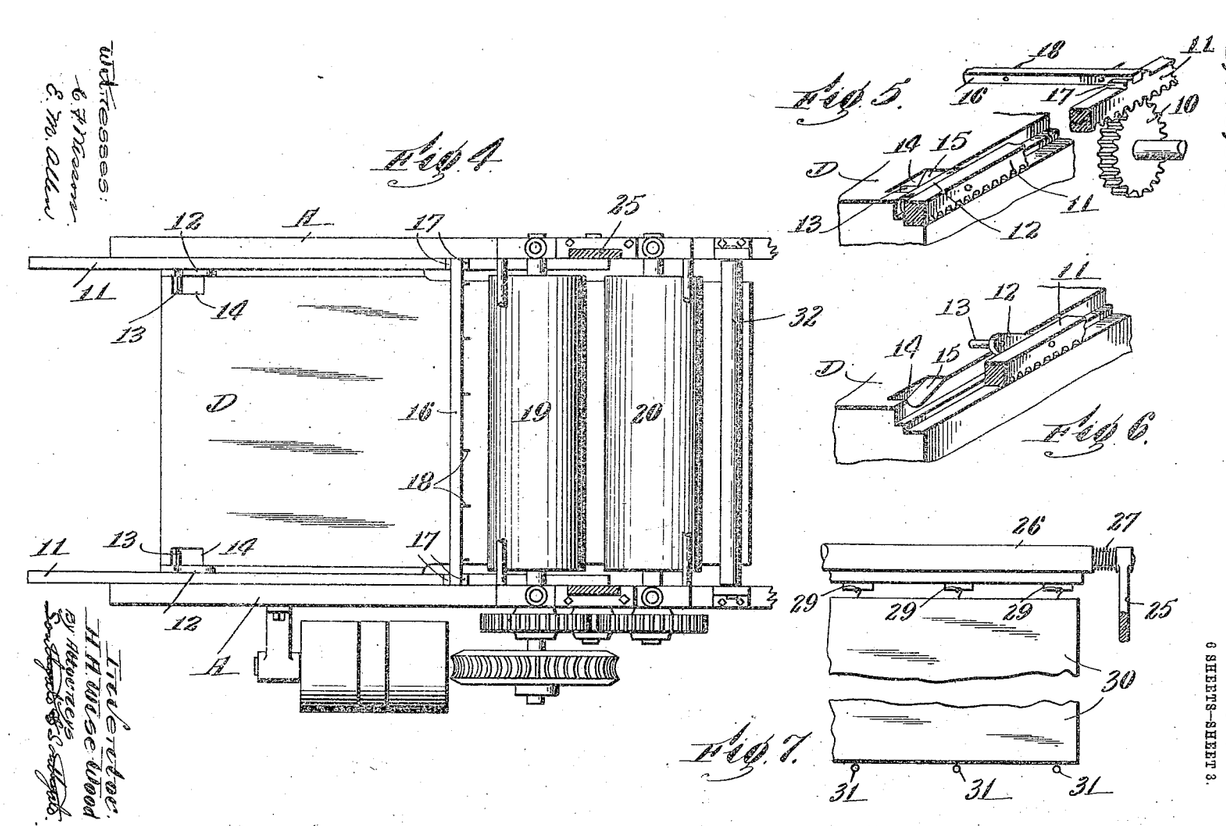
Fig. 4 is a plan of a portion of the same machine.
Fig. 5 is a perspective view of a portion of the feeding device.
Fig. 6 is a perspective view similar to a portion of Fig. 5 showing the parts in operating position.
Fig. 7 is a front elevation of a portion of the machine showing the method of holding the dry blanket.
Figure 8:
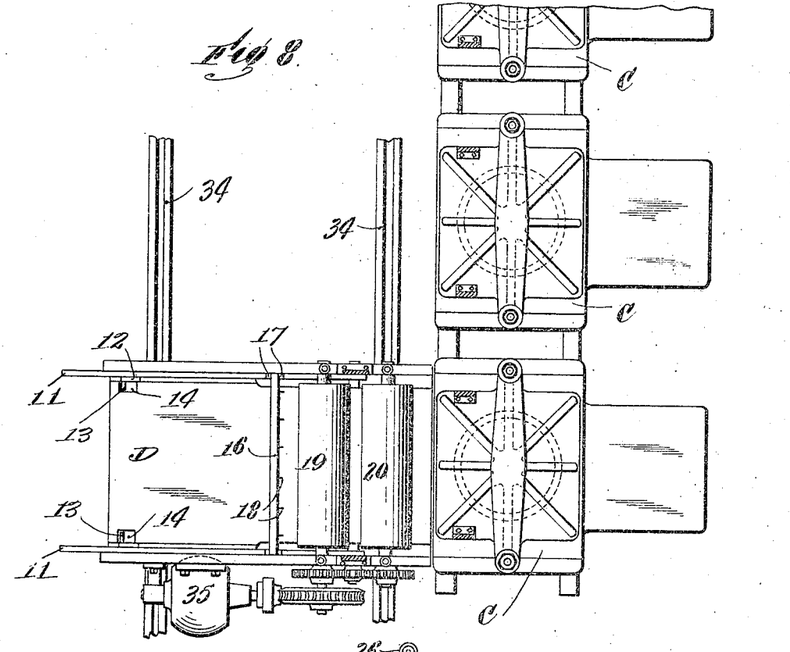
Fig. 8 is a plan of a machine exhibiting the same principles and showing a plurality of drying devices or steam tables connected with one molding machine.
Figure 9:
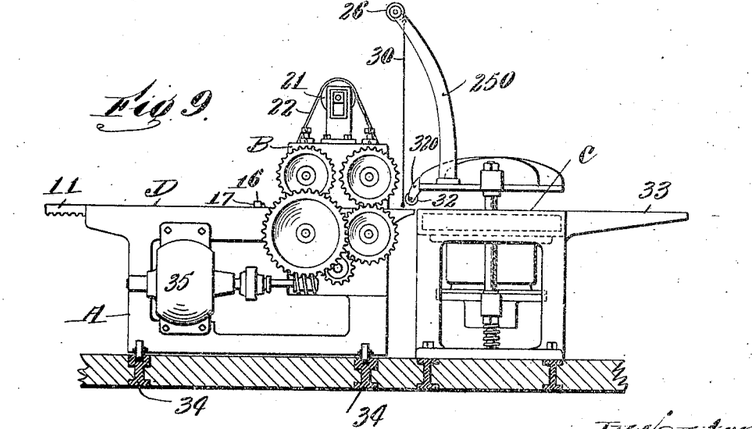
Fig. 9 is an end elevation of the same.

In Figs. 8 and 9 I have shown a form of the invention in which there are a plurality of drying devices C arranged in a row, the frame A being divided at a point between the molding and drying devices, and the main part of the frame being movable on tracks 34 along the several drying devices. In this form the blanket is supported by a frame 250 mounted on the platen of the press and the roller 32 is mounted on a projection 320 also connected with the platen. I have also shown in this form a motor 35 for operating the mechanism, otherwise the parts are substantially the same as above described. In this form of machine a matrix can be molded and then introduced into one of the drying devices and held there while a number of other matrices are molded and dried. Then the first one can be removed in the ordinary way or the molding machine can be brought back and the form pushed out of the first drying device in the manner described above.

Figure 10:
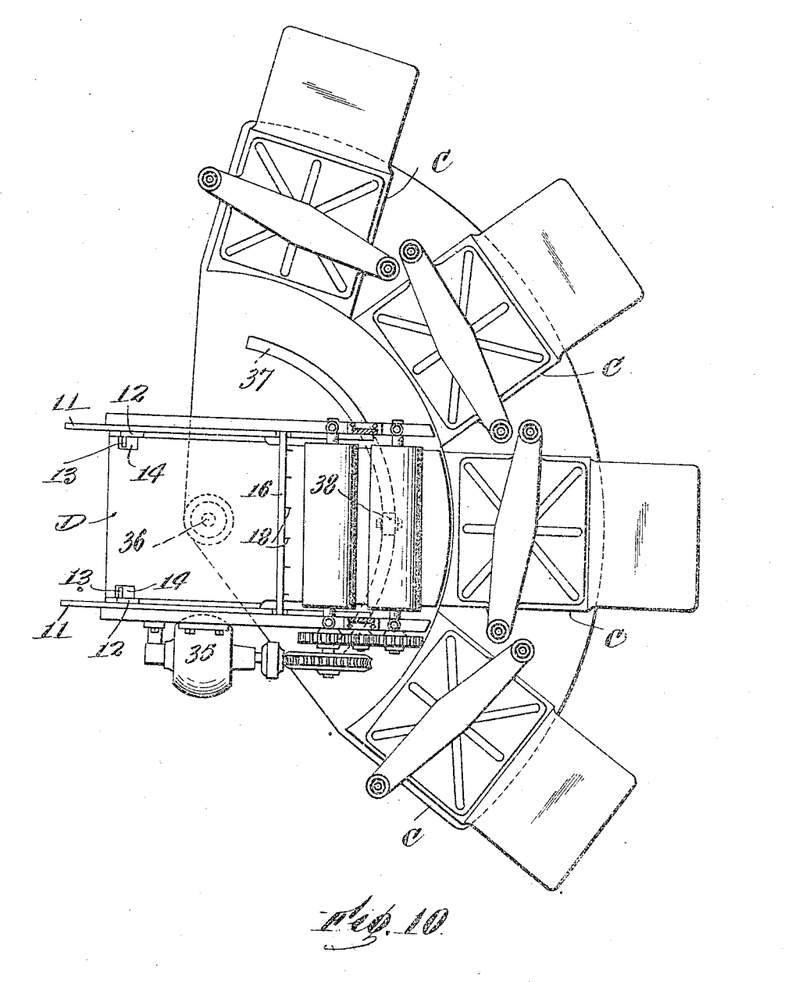
Fig. 10 is a plan of a machine showing another form in which my invention may be embodied.
Figure 11:
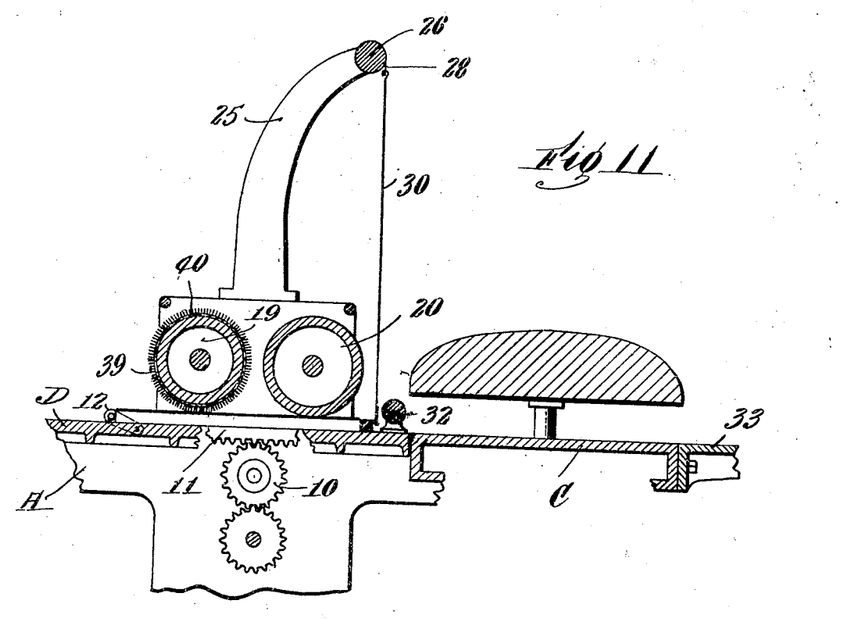
Fig. 11 is a sectional view of a portion of the same on an enlarged scale.
Figure 12:
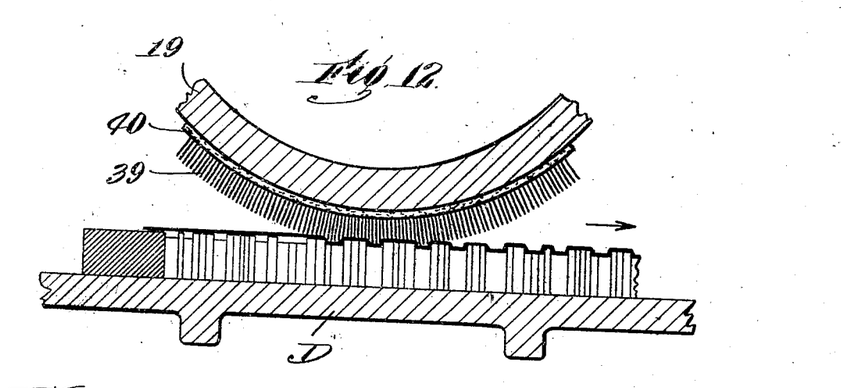
Fig. 12 is a view showing a portion of one of the rollers appearing in Fig. 11 and illustrating its manner of operation on an enlarged scale.

In the form shown in Figs. 10, 11, and 12, the same principles are involved, but the molding device instead of being mounted to move on an ordinary track, is pivoted on a stud 36 and is provided with a curved track 37 on which a wheel 38 runs, the drying presses being mounted on a row concentric with the track 37 so that each of the presses is equally distant from the pivot 36. The operation of this form is substantially the same as above described. I have also shown here the first roller 19 with which the frame comes into contact as provided with bristles 39. This roller or cylinder may be made up of iron as usual with a jacket 40 through which the bristles are woven so that they stand out thickly. The bristles are preferably short and stiff enough to move the flong down into the type face. A blanket woven in this way can be slipped on over the end of the cylinder, and the molding operation itself is performed by the bristles. The other cylinder 20 has a smooth bare surface pressing directly against the back of the mold without any intervening blanket. Therefore, the first cylinder will push the flong into the interstices of the type face in a continuous manner during its operation, and the second cylinder will iron the mold down smoothly upon the face of the form. It is to be understood that this form of molding device can be applied to the forms of machine shown in the other figures.

The form shown in Figs. 10, 11 and 12 is preferably provided with the feeding device and blanket device as above described. The cross-bar which is shown removable as has been stated above can be made stationary when only one steam table is used, but when a plurality are employed, this bar should be movable or it may be entirely dispensed with, the form itself being provided with pins for engaging the flong.

While I have illustrated and described certain particular forms in which the invention may be embodied, I am aware that many changes may be made by persons skilled in the art without departing from the scope of the invention as expressed in the claims. Therefore, I do not wish to be limited to the exact construction shown, but What I do claim and desire to secure by Letters Patent is:—

1. The combination of means for molding a stereotype matrix, a drying device adapted to receive the entire matrix at a time, means for feeding the molded articles from the molding means and depositing them in the drying device, and a table supported by the drying device on the side thereof opposite the molding means.

2. The combination of means for molding stereotype matrices on forms, means for receiving the entire matrix while in contact with the form holding it in stationary position and drying it as a whole, uniformly, and means connected with the molding means for automatically feeding the molded matrices therefrom to the drying means.

3. The combination of means for molding stereotype matrices on forms, means for receiving the entire matrix while in contact with the form and drying it, means connected with the molding means for automatically feeding the molded matrices therefrom to the drying means, and a table supported by the drying means for receiving the forms and molded articles.

4. The combination with means for molding matrices, of means located adjacent to the molding means and in position to receive matrices therefrom for drying matrices, means automatically operated from the molding means for feeding the molded matrices from the molding means to the drying means and out of the drying means, and a table mounted adjacent to the drying means for receiving the matrices therefrom.

5. The combination with means for molding matrices, of means for drying matrices located adjacent thereto, means for feeding the molded matrices from the molding means to the drying means, and means for supporting a blanket in position to move with each matrix to the drying means.

6. The combination with means for molding matrices, of means for drying matrices, and means located adjacent to the receiving side of the drying means for supporting a blanket in position to move into the drying means with a matrix.

7. The combination of means for molding matrices, means for drying matrices, means for feeding the molded matrices from the molding means to the drying means, and a blanket movable with each matrix into the drying means.

8. The combination of a molding device, a blanket adjacent thereto, means for feeding a form through the molding device, means for connecting the form with the blanket, and a drying device located adjacent to the molding device.

9. The combination of a molding device, means for yieldingly and movably supporting a blanket in position to hang down adjacent to the molding device, means for connecting the blanket with the form as the latter passes through the molding device, and a drying device adapted to receive the form and blanket.

10. The combination of a molding device, a drying device, and means for supporting a blanket between the molding device and drying device.

11. The combination of a molding device, a spring roller, flexible connections having eyes, a blanket provided with hooks supported from said eyes at its lower edge, a form adapted to pass through the molding device, and pins for engaging in the eyes on the lower edge of the blanket.

12. The combination of a molding device, means for yieldingly supporting a blanket, a form, and means for engaging and holding the blanket upon the form when it passes through the molding device.

13. The combination of a molding device with means for yieldingly supporting a blanket in a depending position adjacent to the delivery side of the molding device.

14. The combination of a molding device, means for yieldingly supporting a blanket, a form, means for engaging and holding the blanket upon the form when it passes through the molding device, and means located at the discharge end of the molding device for engaging the blanket and forcing it down upon the form as the latter advances.

15. The combination of a molding device, means for yieldingly supporting a blanket, a form, means for engaging and holding the blanket upon it when it passes through the molding device, a roller located at the discharge end of the molding device and in position to engage the blanket and force it down upon the form as the latter advances, and a drying device located adjacent to said roller and adapted to receive the form and blanket.

16. The combination of a yieldingly supported blanket, a form, means for engaging and holding the blanket, and a drying device located in position to receive the form and blanket.

17. In a stereotyping apparatus, the combination of a molding device adapted to receive a form, and means for holding a blanket in position to move with the form as the form is withdrawn from the molding device.

18. In a stereotyping apparatus, the combination of a stereotype matrix drying device adapted to receive a form, and means for holding a blanket in position to move into the drying device with the form.

19. The combination of means for suspending a blanket and a matrix-drying device located adjacent thereto.

20. The combination of means for suspending a blanket, a matrix-drying device located adjacent thereto, and a roller located between the lower end of the suspended blanket and the drying device.

21. The combination of a matrix-molding device, a plurality of drying devices, a blanket connected with the molding device and adapted to move with the form into one of the drying devices, said molding device being movably mounted.

22. The combination of a plurality of matrix drying devices, and a movable matrix molding device movable bodily into registration with each of said matrix drying devices whereby matrices may be transferred directly from the molding device to any desired one of the drying devices.

23. The combination of a plurality of matrix drying devices arranged on the arc of a circle, and a swinging matrix molding device pivoted at the center of said circle and adapted to swing into registration with each of said matrix drying devices.

24. The combination of a matrix-molding device, and a plurality of matrix-drying devices located adjacent thereto, said molding device and drying devices being relatively movable whereby the molding device may deliver matrices to any of the drying devices.

25. The combination of means for molding matrices, means for drying matrices, and means for feeding the molded matrices from the molding means to the drying means, said feeding means comprising a reciprocable bar, a table along the side of which the bar moves, and a pin carried by the bar for engaging a form.

26. The combination of a matrix-molding device, a feeding device, said feeding device comprising a movable bar and a pin mounted on the bar, and a stationary table having a recess for receiving the pin during the stroke of the bar.

27. The combination of a feeding device for a matrix molding machine, comprising a reciprocable bar, an arm pivotally mounted thereon, and a pin projecting from said arm with a stationary table for receiving forms, said table having a depression for receiving said pin at the end of the reverse stroke of the bar.

28. The combination of a feeding device for matrix molding machines, comprising a reciprocable bar, an arm pivotally mounted thereon, said arm having a projection with a table having a flat surface along which said projection moves during the motion of the bar, said table having a depression to receive the projection at one end of the stroke of the bar, said projection being adapted to engage the rear of a form and feed it along the table.

29. The combination of a feeding device for matrix-molding machines, comprising a reciprocable bar with a table having a flat surface, and means carried by the bar for engaging the rear of a form during the major portion of the stroke of the bar, said table having a socket for permitting said engaging means to descend below the surface of the table at the end of the stroke of the bar.

30. The combination of a feeding device for matrix molding machines, comprising a reciprocable bar with a table having a flat surface, and means carried by said bar for engaging the rear of a form during the major portion of the stroke of the bar, said table having a socket for permitting said engaging means to descend below the surface of the table at the end of the stroke of the bar, and a bar having projecting pins for engaging a blanket.

31. The combination of a matrix molding device, a feeding device, said feeding device comprising a movable bar, and a pin mounted on the bar, and a stationary table having a recess for receiving the pin during the stroke of the bar, said molding device comprising a roll having bristles and a smooth roll.

32. In a matrix molding machine, the combination of a rotary molding roll provided with substantially radial bristles for preliminarily molding the flong into the type face, a following rotary smooth faced roll for bearing on the back of the mold and pressing it down upon the face of the type, and means for rotating both of said rolls, whereby the molding and pressing operations will be performed continuously.

33. In a matrix molding machine, the combination of a molding roller or cylinder, with a jacket having bristles woven therethrough and standing out normally to the surface of said roller, said jacket being removable.

34. A stereotype molding machine having a reciprocating table and two molding rolls, one having substantially radial bristles and the other being smooth or flat, and means for reciprocating the table under the rolls and turning the rolls so that the peripheries thereof will move substantially at the same speed as the reciprocation of the table, whereby a form of type and a stereotype matrix can be fed under the rolls so that the bristles on the first roll will mold the matrix to the form progressively and the other roll will press or smooth the matrix on the form.

In testimony whereof I have hereunto set my hand, in the presence of two subscribing witnesses.

H. A. WISE WOOD.

Witnesses:
ANNIE B. WALTERS,
MARY E. McCADDEN.